(12) United States Patent
Reynolds

(10) Patent No.: US 11,260,604 B2
(45) Date of Patent: Mar. 1, 2022

(54) METHOD AND SYSTEM FOR DISPENSING MOLTEN WAX INTO MOLDS BY MEANS OF A DESKTOP APPARATUS

(71) Applicant: Andrew James Reynolds, Shaker Heights, OH (US)

(72) Inventor: Andrew James Reynolds, Shaker Heights, OH (US)

(73) Assignee: Andrew Reynolds, Shaker Heights, OH (US)

(*) Notice: Subject to any disclaimer, the term of this patent is extended or adjusted under 35 U.S.C. 154(b) by 511 days.

(21) Appl. No.: 16/501,218

(22) Filed: Mar. 11, 2019

(65) Prior Publication Data
US 2019/0291359 A1 Sep. 26, 2019

Related U.S. Application Data
(60) Provisional application No. 62/761,250, filed on Mar. 14, 2018.

(51) Int. Cl.
*B29C 67/24* (2006.01)
*C11C 5/02* (2006.01)

(52) U.S. Cl.
CPC .......... *B29C 67/241* (2013.01); *C11C 5/023* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,351,239 A * | 11/1967 | Flock | ............... | B67D 3/0003 222/54 |
| 3,612,147 A * | 10/1971 | Kaplan | ............... | B29C 67/241 164/45 |
| 3,680,995 A * | 8/1972 | Frazier, Jr. | ............ | B29C 67/241 425/200 |
| 3,831,899 A * | 8/1974 | Doig | ............... | C11C 5/02 249/97 |
| 3,998,922 A * | 12/1976 | Weiss | ............... | C11C 5/023 264/255 |
| 4,518,288 A * | 5/1985 | Cilindro | ............... | B22C 7/02 106/38.8 |
| 4,614,859 A * | 9/1986 | Beckering | ............... | F24H 1/185 219/214 |
| 4,956,233 A * | 9/1990 | Chu | ............... | B29C 55/026 428/349 |
| 4,971,547 A * | 11/1990 | Nett, Jr. | ............... | B29C 67/241 425/135 |
| 5,121,329 A * | 6/1992 | Crump | ............... | B33Y 40/00 700/119 |
| 5,123,569 A * | 6/1992 | Lindner | ............... | B29C 67/241 219/421 |

(Continued)

*Primary Examiner* — Kevin R Kruer

(57) ABSTRACT

Method and system for dispensing molten wax into molds by means of a desktop apparatus is disclosed. The invention being comprised of a heating chamber, temperature controller, metering dispenser, adjustable base, lighting strip and protective viewing cabinet. Said invention allowing wax to be melted and maintained at a temperature below the melting point of mold materials such as; but not limited to, filaments commonly used in 3D printing and the like. An object of the invention is to allow users to quickly position and fill custom molds for fabrication processes such as candle and jewelry making.

4 Claims, 2 Drawing Sheets

(56) References Cited

U.S. PATENT DOCUMENTS

| | | | | |
|---|---|---|---|---|
| 5,141,680 A * | 8/1992 | Almquist | | B29C 41/12 264/401 |
| 5,452,219 A * | 9/1995 | Dehoff | | A61C 13/0004 700/163 |
| 5,820,903 A * | 10/1998 | Fleury | | A23C 9/133 426/74 |
| 5,855,237 A * | 1/1999 | Okada | | B22D 29/001 164/113 |
| 5,908,067 A * | 6/1999 | Carr | | B29C 33/446 164/312 |
| 5,950,703 A * | 9/1999 | Itou | | B22C 9/043 164/35 |
| 5,988,446 A * | 11/1999 | Schitter | | C11C 5/023 141/331 |
| 6,412,670 B1 * | 7/2002 | Randmae | | C11C 5/023 222/452 |
| 6,783,352 B2 * | 8/2004 | Shiau | | B29C 67/241 165/184 |
| 9,802,248 B2 * | 10/2017 | Marcin, Jr. | | B22C 9/101 |
| 9,993,951 B2 * | 6/2018 | McCauley | | B29C 67/241 |
| 2009/0092938 A1 * | 4/2009 | Husted | | C11C 5/025 431/292 |
| 2010/0176560 A1 * | 7/2010 | Burgess | | F16J 15/061 277/637 |
| 2011/0180227 A1 * | 7/2011 | Anglin | | B22C 7/02 164/44 |
| 2014/0322389 A1 * | 10/2014 | Prakash | | A23G 9/32 426/72 |
| 2015/0336300 A1 * | 11/2015 | McCauley | | B29C 39/24 264/319 |
| 2016/0158834 A1 * | 6/2016 | J. | | B22D 29/00 164/45 |
| 2016/0167309 A1 * | 6/2016 | Liu | | B29C 64/106 264/40.1 |
| 2019/0162223 A1 * | 5/2019 | Burock | | B05C 13/025 |
| 2019/0168448 A1 * | 6/2019 | Osiroff | | B29C 39/34 |
| 2019/0209557 A1 * | 7/2019 | Garland | | A61K 47/32 |
| 2019/0284504 A1 * | 9/2019 | Jang | | C11C 5/023 |
| 2019/0291359 A1 * | 9/2019 | Reynolds | | B29C 67/241 |

* cited by examiner

METHOD AND SYSTEM FOR DISPENSING MOLTEN WAX INTO MOLDS BY MEANS OF A DESKTOP APPARATUS

FIELD OF THE INVENTION

The present invention generally relates to molds. More specifically, it relates to a method and system for melting and dispensing wax into molds on a secured base within an enclosure.

BACKGROUND

Candle making dates back centuries when the Romans began making dipped candles from animal fat for lighting around 500 B.C. The Chinese began making candles from whale fat during the Qin Dynasty in 200 B.C. Candle making became industrialized much later in the mid 19th century by Joseph Morgan, a pewterer from England. Mr. Morgan patented a machine that allowed for continuous production of molded candles by filling a cylinder with molten wax and allowing a piston to eject candles as they solidified. With the emergence of electrical lighting, the demand for candles subsided; however, candles continued to be used by many artists to make castings for sculptures and jewelry. To support such artists and hobbyists, manufacturers developed several types of electric heating and dispensing units for wax. U.S. Pat. No. 7,315,691B1 granted to Palkie disclosed a temperature controlled wax dispenser that do not include an adjustable support base. U.S. Patent No.s 20130240568A1 and U.S. Pat. No. 5,123,569A granted to Shiau and Lindner respectively disclosed temperature controlled wax dispensers that do not include a protective cabinet. While several electric heating wax dispensers were found, no patents were found in the prior art that included an adjustable base plate to accommodate various-sized molds.

SUMMARY OF THE INVENTION

The device herein disclosed and described provides a solution to the shortcomings in the prior art through the disclosure of a method and system for dispensing molten wax into molds by means of a desktop apparatus. An object of the invention is to provide a means to fill custom molds. Users can place custom molds inside the device and it will heat and dispense molten wax into said molds.

Another object of this invention is to provide a means to store wax during the mold filling process. Users can store substantial amounts of stock wax inside the pot located in the upper portion of the device and retain enough wax to generate multiple pours during a single operation.

Another object of this invention is to provide a means to allow stored molten wax to remain at a constant temperature. A cartridge heating element in the base plate creates even heat distribution throughout the pot allowing wax to be held at a fixed, constant temperature. In addition, an externally-mounted electronic temperature control unit manages the temperature of the melting pot with a line voltage thermostat. This unit also includes a temperature readout display for visual verification.

Another object of the aforementioned invention is to provide a means to meter molten wax into molds at precise amounts. A ball valve at the base of the melting pot includes a finger knob that adjusts the opening of the valve to allow for precise amounts of wax to be dispensed according to a user's preferences.

Another object of the aforementioned invention is to provide a means to secure various sized molds for filling. A 'mold carrier' apparatus comprised of adjustable walls firmly secures molds of various shapes and sizes within the invention in order to obtain a consistent fill. The width of the walls on the mold carrier are adjusted by turning knobs attached to threaded rods that engage said walls.

Another object of the aforementioned invention is to provide a means to illuminate the process of pouring wax into molds. A light emitting diode (LED) strip positioned at the top of the cabinet provides enough illumination to allow a user to visually inspect the pouring process and ensure smooth operations.

It is briefly noted that upon reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention, and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

BRIEF DESCRIPTION OF THE FIGURES

The accompanying drawings, which are incorporated herein and form a part of the specification, illustrate some, but not the only or exclusive, examples of embodiments and/or features.

Figure 1:
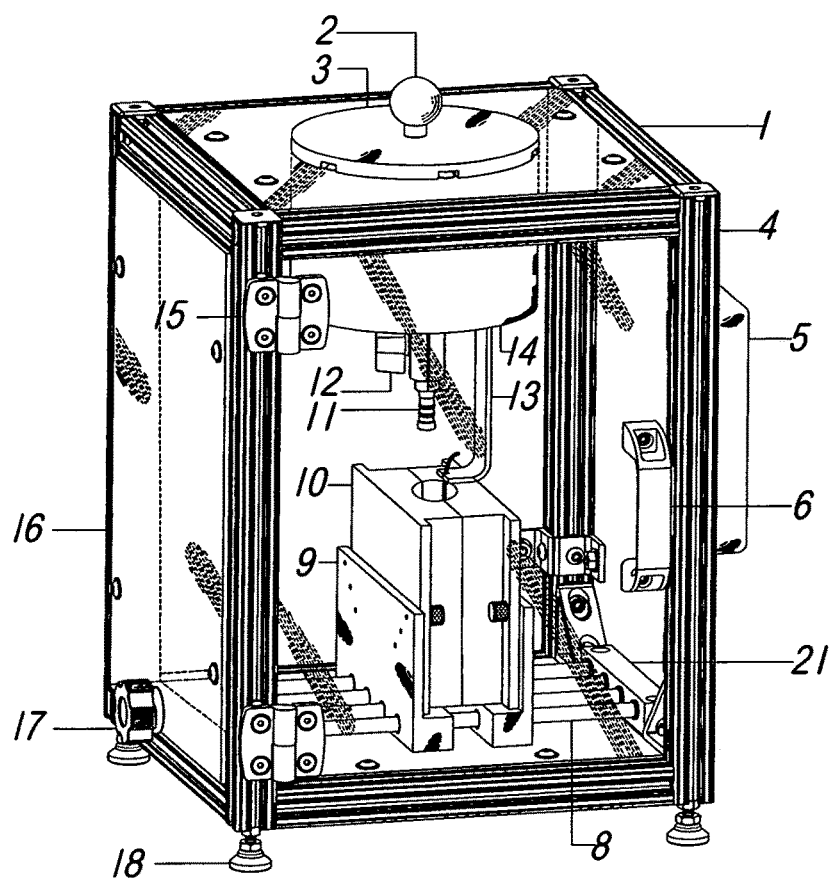
FIG. 1 shows a perspective view of the invention being used.

Other aspects of the present invention shall be more readily understood when considered in conjunction with the accompanying drawings, and the following detailed description, neither of which should be considered limiting.

DETAILED DESCRIPTION OF FIGURES

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

FIG. 1 shows a perspective view of the invention in operation with the invention comprised of several main parts: a cabinet 1, a melting pot 3, a heating element 5, a metering valve 12, and an adjustable mold carrier 9. Said melting pot 14 being a cylindrically-shaped, hollow chamber made of but not limited to, a rigid metal such as aluminum and the like with a circular-shaped lid 3 with handle 2 thereon. A proximal portion of said melting pot 14 having a threaded orifice configured to receive spigot 12 with nipple 11 therein. The aforementioned spigot being adapted parallel to said melting pot 14's longitudinal axis and comprised of a ball valve with piviotably-rotating finger knob 12 allowing molten wax 25 to be precisely released from said melting pot 14. The figure also showing mold carrier 9 being comprised of two, rectangular-shaped plates affixed to a plurality of threaded rods 8 being connected to said cabinet 1 by means of rectangular-shaped bearing blocks 21. Said mold carrier 9, rods 8 and bearing blocks 21 being made of a rigid material such as, but not limited to: steel, aluminum and the like. The aforementioned mold carrier components having a multitude of threaded orifices configured to engage threaded rods 8 and being selectively positioned along the longitudinal axis of said rods 8 by means of positioning knobs 17.

Figure 2:
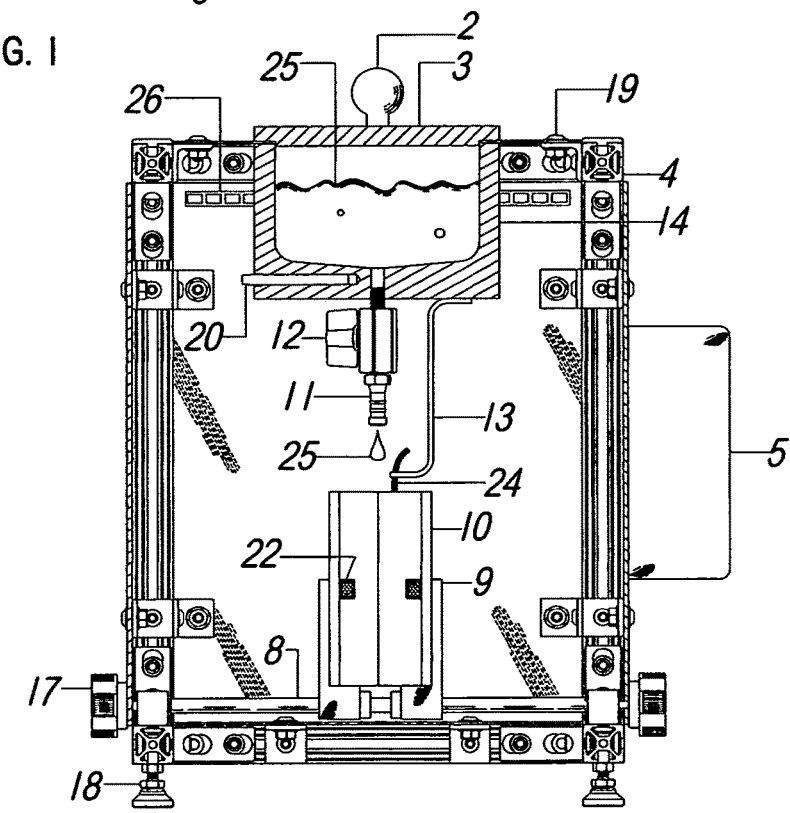
FIG. 2 shows a section view of the invention.
Figure 3:
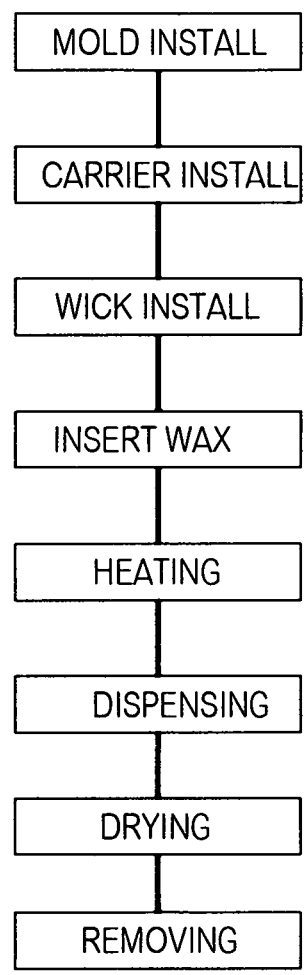
FIG. 3 shows the method of the invention.

FIG. 2 shows a section view of the invention with melting pot 14 with molten wax 25 and having a cylindrical chamber disposed to receive cartridge heater 20 controlled by temperature controller 5 therein. FIG. 2 showing wick post 13 holding wick 24 in position while molten wax 25 is being dispensed from spigot 12 into mold 10. Said mold 10 being selectively affixed to the aforementioned mold carrier 9 by means of several threaded holes that receive selectively adjustable positioning bolts 22 thereon. The figure also showing mold carrier 9 being connected to cabinet 1 by means of said threaded rods 8 and bearing blocks 21. Cabinet 1 comprised of translucent panels 16 supported by a plurality of framing members 4 made of a rigid metal such as, but not limited to, aluminum 80/20[198] members and the like. Said framing members 4 also being cleverly connected by means of fasteners 19. Said cabinet 1 also having a door with hinges 15 and handle 6 thereon. The cabinet 1 also having adjustable feet 18 allowing the invention to be leveled on a desk thereatop. Finally, an LED lighting strip 26 being connected to a distal end of said cabinet 1. FIG. 3 shows the method of the apparatus includes but is not limited to the following steps: installing a mold on the adjustable mold carrier, clamping the adjustable mold carrier against the mold halves, installing a wick on the wick post, placing wax into the melting pot, turning on the heating element and allowing the wax to melt, opening the spigot, dispensing wax into the mold, waiting for the wax to dry, spreading the adjustable mold carrier, and removing the mold.

What is claimed is:

1. A device for dispensing molten wax into molds comprising:
   a) a cabinet having a top, a bottom, and sides wherein the cabinet comprises translucent panels supported by a plurality of framing members;
   b) a LED lighting strip positioned at the top of the cabinet;
   c) a door with hinges and a handle on one side of said cabinet;
   d) a melting pot with a spigot located inside said cabinet; wherein the melting pot comprises a lid exterior to the top of said cabinet;
   e) a heating element in the melting pot;
   f) a temperature controller to control the temperature of the melting pot mounted on the exterior of said cabinet;
   g) an adjustable mold carrier comprising two rectangular plates affixed to threaded rods, said adjustable mold carrier is connected to said cabinet by means of bearing clocks and is selectively positioned along the longitudinal axis of said rods by means of positioning knobs; and
   h) a wick post to hold a wick in position while molten wax is being dispensed from said spigot.

2. The system for dispensing molten wax into molds of claim 1, wherein said heating element is a cartridge heater.

3. The system for dispensing molten wax into molds of claim 1, wherein the cabinet has adjustable feet.

4. A method for dispensing molten wax into molds, the method is comprised of the following steps:
   a) providing the device for dispensing molten wax into molds of claim 1,
   b) installing a mold comprising two mold halves on the adjustable mold carrier,
   c) clamping the adjustable mold carrier against the mold halves;
   d) installing the wick on the wick post;
   e) placing wax into the melting pot;
   f) turning on the heating element and allowing the wax to melt;
   g) opening the spigot;
   h) dispensing the wax into the mold;
   i) waiting for the wax to dry;
   j) spreading the adjustable mold carrier, and
   k) removing the mold.

* * * * *